US007171164B2

(12) United States Patent
Ylitalo

(10) Patent No.: US 7,171,164 B2
(45) Date of Patent: Jan. 30, 2007

(54) METHOD OF ESTIMATING DOWNLINK CHANNEL, AND USER EQUIPMENT

(75) Inventor: Juha Ylitalo, Oulu (FI)

(73) Assignee: Nokia Corporation, Espoo (FI)

( * ) Notice: Subject to any disclaimer, the term of this patent is extended or adjusted under 35 U.S.C. 154(b) by 475 days.

(21) Appl. No.: 10/328,569

(22) Filed: Dec. 23, 2002

(65) Prior Publication Data

US 2003/0157898 A1 Aug. 21, 2003

(30) Foreign Application Priority Data

Dec. 28, 2001 (FI) .................................. 20012587

(51) Int. Cl.
*H04B 7/08* (2006.01)
(52) U.S. Cl. ................... 455/67.16; 375/148; 375/267; 375/347
(58) Field of Classification Search ................ 455/101, 455/67.16; 370/491; 375/147–149, 347, 375/340, 267
See application file for complete search history.

(56) References Cited

U.S. PATENT DOCUMENTS

| 5,953,325 A | 9/1999 | Willars |
| 6,108,565 A | 8/2000 | Scherzer |
| 6,411,186 B1 | 6/2002 | Lilleberg et al. |
| 6,411,649 B1* | 6/2002 | Arslan et al. ................ 375/232 |
| 6,792,036 B2* | 9/2004 | Doetsch et al. ............. 375/149 |
| 2001/0043642 A1 | 11/2001 | Hirata |
| 2003/0086508 A1* | 5/2003 | Magee ........................ 375/340 |

FOREIGN PATENT DOCUMENTS

| EP | 001065800 A1 * | 7/1999 |
| EP | 1 065 800 A1 | 1/2001 |
| WO | WO 98/59512 A1 | 12/1998 |
| WO | WO 02/089358 A1 | 11/2002 |

OTHER PUBLICATIONS

Korhonen, J, "Introduction to 3G Mobile Communications", Artech House, 2001.
Masafumi Usuda; Yoshihiro Isikawa; and Seizo Onoe, "Optimizing the Number of Dedicated Pilot Symbols for Foward Link W-CDMA Systems," IEEE 51st Vehicular Technology Conference Proceedings, Tokyo, Japan, May 15-18, 2000; IEEE 51st Vehicular Technology Conference, New York, May 15, 2000 (pp. 2118-2122).
3GPP TS 25.211 V3.7.0 (2001-2006), "3rd Generation Partnership Project; Technical Specification Group Radio Access Network; Physical channels and mapping of transport channels onto physical channels (FDD)," Release 1999.

* cited by examiner

*Primary Examiner*—Edward F. Urban
*Assistant Examiner*—Adeel Haroon
(74) *Attorney, Agent, or Firm*—Hollingsworth & Funk, LLC

(57) ABSTRACT

The invention relates to a method of estimating a downlink channel in a radio system, and user equipment in a radio system. The user equipment is configured to form an impulse response for a common pilot channel transmitted with a wide antenna beam and an impulse response for a beam-specific pilot signal transmitted with a directional narrow antenna beam. The user equipment is further configured to calculate the impulse response of the downlink channel by using the impulse response of the common pilot channel and the impulse response of the beam-specific pilot signal, taking into account the phase difference formed.

26 Claims, 4 Drawing Sheets

METHOD OF ESTIMATING DOWNLINK CHANNEL, AND USER EQUIPMENT

FIELD

The invention relates to a method of estimating a downlink channel in a radio system, and user equipment in a radio system.

BACKGROUND

As the number of users of cellular radio systems increases and rapid data transmission becomes more and more common in the systems, it becomes essentially important to increase the capacity of the system by improving the system performance.

The channel used causes frequently different kinds of interference for data transmission, for example attenuation and corruption of the signal. The received signal is often corrupted by intersymbol interference (ISI).

In receivers using TDMA (Time Division Multiple Access), an adaptive channel equalizer is often used, by means of which signal corruption and attenuation caused by the channel can be taken into account. In receivers using CDMA, (Code Division Multiple Access), the corresponding function is performed by a Rake receiver well known by those skilled in the art.

The equalizer must know the impulse response of the radio channel in order to perform successful equalization. A known way of performing channel estimation and signal equalization is to generate an estimate of the impulse response of the radio channel, in other words a channel estimate, and to equalize the received radio bursts by using the received equalization data. In a Rake receiver, each Rake finger typically comprises a channel estimator, by means of which a complex channel coefficient is estimated for each multipath-propagated signal path to be corrected.

One way to increase the capacity is the use of one or more adaptive antenna arrays instead of sector antennas. In an antenna array, single antenna elements are typically positioned close to each other, for example at a distance of half a wavelength from each other. Typically, the number of antenna elements is divisible by two to facilitate Fourier transform. An adaptive antenna array can be used in two ways: a user-specific antenna beam is turned dynamically towards the receiver, in which case the movement of the receiver is followed by an antenna beam; or the most suitable one of the antenna beams is selected, in which case a fixedly directed antenna beam is changed when the receiver is moving. When fixedly directed antenna beams are used, the basic principle is to form a set of narrow, adjacent antenna beams covering partly overlapping sectors. The most suitable one of the antenna beams is selected for the downlink channel transmission. Reuse of frequencies can be made more efficient and the power of transmitters reduced, because interference caused for other users is decreased owing to the directivity of the antenna beams.

Estimating the downlink channel is problematic in systems using an adaptive antenna array, because in such systems the user equipment can simultaneously receive several different antenna beams with control channels.

BRIEF DESCRIPTION

An object of the invention is to provide an improved method of estimating a downlink channel, and improved user equipment for a radio system.

A method of estimating a downlink channel in a radio system is provided as an aspect of the invention, which method comprises: forming an impulse response for a common pilot signal transmitted with a wide antenna beam; forming an impulse response for a beam-specific pilot signal transmitted with a directional narrow antenna beam; forming a phase difference between the wide antenna beam and the directional narrow antenna beam; and forming an impulse response for the downlink channel by using the impulse response of the common pilot signal and the impulse response of the beam-specific pilot signal, taking into account the phase difference formed.

User equipment of a radio system is provided as an aspect of the invention, comprising: means for forming an impulse response for a common pilot signal transmitted with a wide antenna beam; means for forming an impulse response for a beam-specific pilot signal transmitted with a directional narrow antenna beam; and impulse response means for forming an impulse response for the downlink channel by using the impulse response of the common pilot signal and the impulse response of the beam-specific pilot signal, taking into account the phase difference formed.

User equipment of a radio system is provided as an aspect of the invention, being configured to: form an impulse response for a common pilot signal transmitted with a wide antenna beam; form an impulse response for a beam-specific pilot signal transmitted with a directional narrow antenna beam; and form an impulse response for the downlink channel by using the impulse response of the common pilot signal and the impulse response of the beam-specific pilot signal, taking into account the phase difference formed.

The invention is based on the idea that user equipment utilizes at least two pilot signals transmitted with different antenna beams, the channel impulse response being defined for both signals, and the combined impulse response for the downlink channel being then formed, taking into account the phase difference that has been either formed in the user equipment or obtained from the network part of the radio system by signalling.

The method and user equipment according to the invention provide improvement of the performance of a radio system, which thus increases the capacity of the radio system.

LIST OF FIGURES

The invention will now be described in more detail in connection with preferred embodiments, with reference to the attached drawings, in which FIG. 1 is a simplified block diagram illustrating the structure of a radio system;

DESCRIPTION OF EMBODIMENTS

Figure 1:
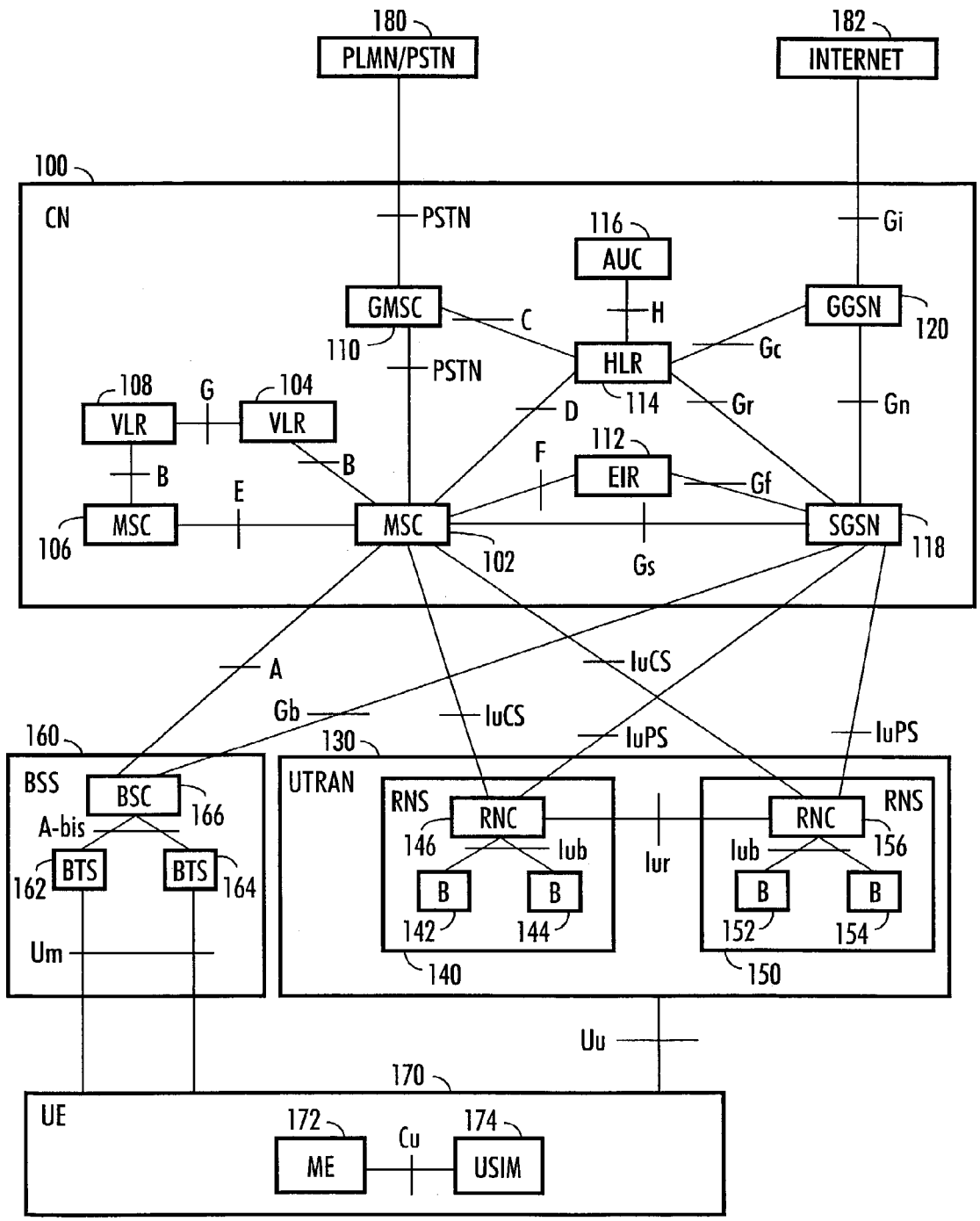

Because second-generation radio systems and third-generation radio systems and various combinations thereof, i.e. so-called 2.5-generation radio systems, are already used worldwide and being continuously developed, FIG. 1 illustrates a radio system which comprises network elements of different generations in parallel. In the description, GSM (Global System for Mobile Communications) represents the second-generation radio systems, a GSM-based radio system, which employs EDGE (Enhanced Data Rates for Global Evolution) technology for increasing the data transmission rate and can also be used for implementing packet transmission in a GPRS (General Packet Radio System) system, represents the 2.5-generation radio systems, and a radio system known at least as IMT-2000 (International Mobile Telecommunications 2000) and UMTS (Universal Mobile Telecommunications System) represents the third-generation radio systems. The embodiments are, however, not restricted to these systems described by way of example, but a person skilled in the art can also apply the instructions to other radio systems using channel estimation and adaptive antenna arrays. Further information on the radio system can, if necessary, be obtained in trade literature, for instance in *Juha Korhonen: Introduction to 3G Mobile Communications,* Artech House 2001, ISBN 1-58053-287-X. Basic principles of the CDMA system are also described in patent FI 101 659, U.S. patent application Ser. No. 09/214,801 based on this patent being incorporated herein by reference.

FIG. 1 is a simplified block diagram which shows the most important parts of a radio system and the interfaces between them at network-element level. The structure and functions of the network elements are not described in detail, because they are generally known.

The main parts of a radio system are a core network (CN) 100, a radio access network 130 and user equipment (UE) 170. The term UTRAN is short for UMTS Terrestrial Radio Access Network, i.e. the radio access network 130 belongs to the third generation and is implemented by wideband code division multiple access (WCDMA) technology. FIG. 1 also shows a base station system 160 which belongs to the 2/2.5 generation and is implemented by time division multiple access (TDMA) technology.

On a general level, the radio system can also be defined to comprise user equipment, which is also known as user equipment and mobile phone, for instance, and a network part, which comprises the fixed infrastructure of the radio system, i.e. the core network, radio access network and base station system.

The structure of the core network 100 corresponds to a combined structure of the GSM and GPRS systems. The GSM network elements are responsible for establishing circuit-switched connections, and the GPRS network elements are responsible for establishing packet-switched connections, some of the network elements are, however, in both systems.

A mobile services switching centre (MSC) 102 is the centre point of the circuit-switched side of the core network 100. The same mobile services switching centre 102 can be used to serve the connections of both the radio access network 130 and the base station system 160. The tasks of the mobile services switching centre 102 include: switching, paging, user equipment location registration, handover management, collection of subscriber billing information, encryption parameter management, frequency allocation management, and echo cancellation.

The number of mobile services switching centres 102 may vary: a small network operator may only have one mobile services switching centre 102, but in large core networks 100, there may be several. FIG. 1 shows a second mobile services switching centre 106, but its connections to other network elements are not shown to keep FIG. 1 sufficiently clear.

Large core networks 100 may have a separate gateway mobile services switching centre (GMSC) 110 which takes care of circuit-switched connections between the core network 100 and external networks 180. The gateway mobile services switching centre 110 is located between the mobile services switching centres 102, 106 and the external networks 180. An external network 180 can be for instance a public land mobile network (PLMN) or a public switched telephone network (PSTN).

A home location register (HLR) 114 contains a permanent subscriber register, i.e. the following information, for instance: an international mobile subscriber identity (IMSI), a mobile subscriber ISDN number (MSISDN), an authentication key, and when the radio system supports GPRS, a packet data protocol (PDP) address.

A visitor location register (VLR) 104 contains roaming information on user equipment 170 in the area of the mobile services switching centre 102. The visitor location register 104 contains almost the same information as the home location register 114, but in the visitor location register 104, the information is kept only temporarily.

An equipment identity register (EIR) 112 contains the international mobile equipment identities (IMEI) of the user equipment 170 used in the radio system, and a so-called white list, and possibly a black list and a grey list.

An authentication centre (AuC) 116 is always physically located in the same place as the home location register 114, and contains a subscriber authentication key Ki and a corresponding IMSI.

The network elements shown in FIG. 1 are functional entities whose physical implementation may vary. Usually, the mobile services switching centre 102 and visitor location register 104 form one physical device, and the home location register 114, equipment identity register 112 and authentication centre 116 form a second physical device.

A serving GPRS support node (SGSN) 118 is the centre point of the packet-switched side of the core network 100. The main task of the serving GPRS support node 118 is to transmit and receive packets with the user equipment 170 supporting packet-switched transmission by using the radio access network 130 or the base station system 160. The serving GPRS support node 118 contains subscriber and location information related to the user equipment 170.

A gateway GPRS support node (GGSN) 120 is the packet-switched side counterpart to the gateway mobile services switching centre 110 of the circuit-switched side with the exception, however, that the gateway GPRS support node 120 must also be capable of routing traffic from the core network 100 to external networks 182, whereas the gateway mobile services switching centre 110 only routes incoming traffic. In our example, external networks 182 are represented by the Internet.

The base station system 160 comprises a base station controller (BSC) 166 and base transceiver stations (BTS) 162, 164. The base station controller 166 controls the base transceiver station 162, 164. In principle, the aim is that the devices implementing the radio path and their functions reside in the base transceiver station 162, 164, and control devices reside in the base station controller 166.

The base station controller 166 takes care of the following tasks, for instance: radio resource management of the base transceiver station 162, 164, intercell handovers, frequency control, i.e. frequency allocation to the base transceiver stations 162, 164, management of frequency hopping sequences, time delay measurement on the uplink, implementation of the operation and maintenance interface, and power control.

The base transceiver station 162, 164 contains at least one transceiver which provides one carrier, i.e. eight time slots, i.e. eight physical channels. Typically one base transceiver station 162, 164 serves one cell, but it is also possible to have a solution in which one base transceiver station 162, 164 serves several sectored cells. The diameter of a cell can vary from a few meters to tens of kilometers. The base transceiver station 162, 164 also comprises a transcoder which converts the speech coding format used in the radio system to that used in the public switched telephone network and vice versa. In practice, the transcoder is, however, physically located in the mobile services switching centre 102. The tasks of the base transceiver station 162, 164 include: calculation of timing advance (TA), uplink measurements, channel coding, encryption, decryption, and frequency hopping.

The radio access network 130 is made up of radio network subsystems 140, 150. Each radio network subsystem 140, 150 is made up of radio network controllers 146, 156 and B nodes 142, 144, 151, 154. A B node is a rather abstract concept, and often the term base transceiver station is used instead of it.

Operationally, the radio network controller 140, 150 corresponds approximately to the base station controller 166 of the GSM system, and the B node 142, 144, 152, 154 corresponds approximately to the base transceiver station 162, 164 of the GSM system. Solutions also exist in which the same device is both the base transceiver station and the B node, i.e. said device is capable of implementing both the TDMA and WCDMA radio interface.

The user equipment 170 comprises two parts: mobile equipment (ME) 172 and UMTS subscriber identity module (USIM) 174. The GSM system naturally uses its own identity module. The user equipment 170 contains at least one transceiver for establishing a radio link to the radio access network 130 or base station system 160. The user equipment 170 can contain at least two different subscriber identity modules. In addition, the user equipment 170 contains an antenna, user interface and battery. Today, there are different types of user equipment 170, for instance equipment installed in cars and portable equipment. Properties better known from personal or portable computers have also been implemented in the user equipment 170. One example of this type of user equipment 170 is Nokia® Communicator®. USIM 174 contains information related to the user and information related to information security in particular, for instance an encryption algorithm.

Finally, the interfaces between different network elements shown in FIG. 1 are listed in Table 1. In UMTS, the most important interfaces are the Iu interface between the core network and the radio access network, which is divided into the interface IuCS on the circuit-switched side and the interface IuPS on the packet-switched side, and the Uu interface between the radio access network and the user equipment. In GSM, the most important interfaces are the A interface between the base station controller and the mobile services switching centre, the Gb interface between the base station controller and the serving GPRS support node, and the Um interface between the base transceiver station and the user equipment.

TABLE 1

| Interface | Between network elements |
|---|---|
| Uu | UE-UTRAN |
| Iu | UTRAN-CN |

TABLE 1-continued

| Interface | Between network elements |
|---|---|
| IuCS | UTRAN-MSC |
| IuPS | UTRAN-SGSN |
| Cu | ME-USIM |
| Iur | RNC-RNC |
| Iub | RNC-B |
| A | BSS-MSC |
| Gb | BSC-SGSN |
| A-bis | BSC-BTS |
| Um | BTS-UE |
| B | MSC-VLR |
| E | MSC-MSC |
| D | MSC-HLR |
| F | MSC-EIR |
| Gs | MSC-SGSN |
| PSTN | MSC-GMSC |
| PSTN | GMSC-PLMN/PSTN |
| G | VLR-VLR |
| H | HLR-AUC |
| Gc | HLR-GGSN |
| Gr | HLR-SGSN |
| Gf | EIR-SGSN |
| Gn | SGSN-GGSN |
| Gi | GGSN-INTERNET |

The interface defines what kind of messages different network elements can use in communicating with each other. The aim is to provide a radio system in which the network elements of different manufacturers interwork so well as to provide an effective radio system. In practice, some of the interfaces are, however, vendor-dependent.

Figure 3:
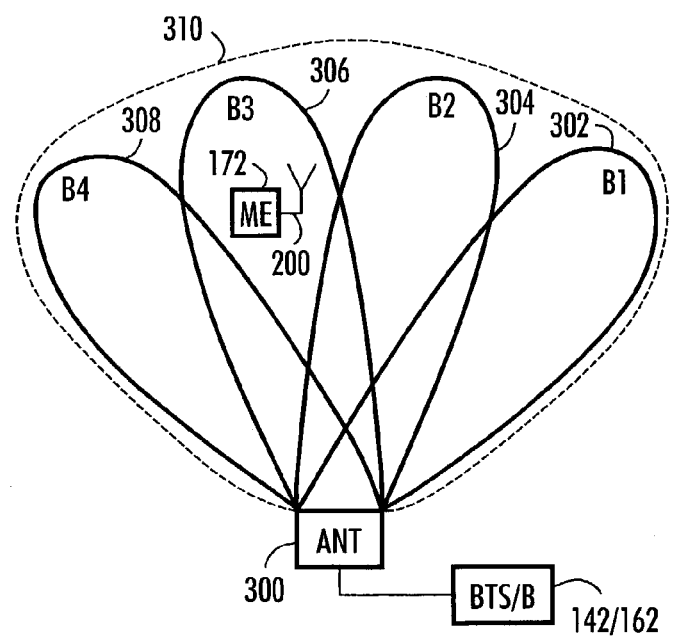
FIG. 3 illustrates antenna beams.
Figure 4:
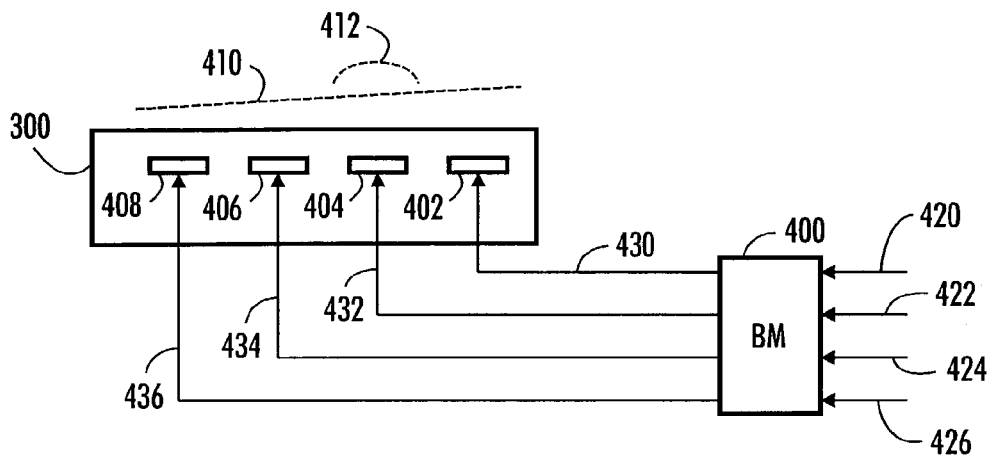
FIG. 4 illustrates an antenna array.

FIGS. 3 and 4 illustrate formation of antenna beams. Fixedly directed antenna beams used in a base transceiver station are typically implemented with a beamforming matrix, for example with a digital or an analogue Butler matrix. Analogically, the beams can also be formed with a phase shift network providing phasing.

The signal is divided in baseband frequency parts into I and Q branches, and the signal of each antenna element is multiplied in a complex manner (i.e. phase angle and amplitude) with appropriate weighting coefficients for transmission. The beams are typically orthogonal. By means of a Butler matrix 400, signals 420, 422, 424, 426 are phased for example in such a way that the signal 420 is directed at a beam 302, the signal 422 at a beam 304, the signal 424 at a beam 306 and the signal 426 at a beam 308. In this way, the desired user signal can be preferably directed in the direction from which the strongest signal transmitted by the particular user has been received. Thus, the inputs of the Butler matrix 400 are formed by beam-specific signals 420, 422, 424, 426, the outputs being formed by antenna-element-specific signals 430, 432, 434, 436.

In a digital implementation, the signal 420, 422, 424, 426 is typically divided in baseband frequency parts into I and Q branches, after which the divided signal is multiplied by weighting coefficients. Weighting coefficients are typically of the form $Ae^{j\phi}$, where A is amplitude and $\phi$ is phase difference. The phasing is achieved by defining the phase difference, which in the case of an antenna array changes in a linear manner from one antenna to another. In signal phasing, the signal of the first antenna used as a reference antenna is not phased, and the phases angles of the signals of other antennas are changed proportioned to the phase difference $\phi$ increasing antenna by antenna.

In a linear antenna array, the phase difference in the antenna element i compared to the first element of the array is proportional to the distance d of the antenna elements according to Formula $$\phi_i = \frac{2\pi}{\lambda} i \cdot d \cdot \sin\varphi, \quad i = 0, 1, 2, 3, \ldots, M - 1 \quad (1)$$

where
λ=wavelength of the antenna signal (carrier wave),
M=number of antenna elements in the array,
d=distance between different antenna elements,
φ=angle at which the antenna beam is directed; and
i=antenna index (i=0 for reference antenna).

TABLE 2

| Beam | Antenna 1 | Antenna 2 | Antenna 3 | Antenna 4 |
|------|-----------|-----------|-----------|-----------|
| B1 | 0° | −135° | −270° | −405° |
| B2 | 0° | −45° | −90° | −135° |
| B3 | 0° | 45° | 90° | 135° |
| B4 | 0° | 135° | 270° | 405° |

Table 2 shows phase angle values of a Butler matrix formed of four antennas for four different antenna beams. These phase differences generate orthogonal beams. For example, the third antenna beam B3 306 is formed in such a way that the signal of the first antenna element 402 of the array 300 is not phased, the signal of the second antenna element 404 is phased 45°, the signal of the third antenna element 406 is phased 90°, and the signal of the fourth antenna element 408 is phased 135°. The signals of all antenna elements having different phases are summed up on the radio path into an antenna beam B3 306. In FIG. 4, the broken line 410 shows the relation of the signal delays (phase angle differences) of different antenna elements 402, 404, 406, 408 to the first antenna element 402 of the antenna array 300 when forming the antenna beam B3 306. The first antenna beam B2 302, the second antenna beam B2 304 and the fourth antenna beam B4 308 are formed in the same way as the third antenna beam B3 306 by using phase differences shown in Table 2.

The beam B1 points to the direction $\phi_1$, the beam B2 points to the direction $\phi_2$, the beam B3 points to the direction $-\phi_2$ and the beam B4 points to the direction $-\phi_1$.

The values of the phase differences, the number of antenna elements and the shape of the antenna beams can be different from what is shown in FIGS. 3 and 4 and in Table 2. There may be, for instance, eight different antenna beams, whereby the phase differences correspondingly deviate from what was described above.

FIG. 4 shows implementation of antenna beams with a digital system. Beam-specific signals 420, 422, 424, 426 to each beam are taken to a digital beamforming matrix 400, which generates antenna-element-specific signals 430, 432, 434, 436, as described above. After this, the signals 430, 432, 434, 436 can be taken to power amplifiers (not shown in FIG. 4), by means of which the power of the signals is amplified for transmission. If the transmission antenna beams to be phased are implemented with an analogue phase shift network, the power amplifiers are before the beam-forming matrix. Finally, the signals 430, 432, 434, 436 are taken to the antenna elements 402, 404, 406, 408 of the antenna array 300 to be transmitted to the radio path. The antenna array using directional antenna beams thus comprises separate antenna elements 402, 404, 406, 408, for instance four or eight different antenna elements.

There can be M pieces of antenna elements, whereby M is an integer greater than one. The antenna elements 402, 404, 406, 408 are arranged in a linear or planar manner, for example. Linearly, the antenna elements can be arranged for instance as a ULA (Uniform Linear Array), in which the antenna elements are positioned on a straight line at even distances from each other. In a planar manner, a CA (Circular Array) can be formed, in which the antenna elements are positioned at the same level, for example horizontally in the form of the periphery of a circle. Thus, a given part of the periphery of the circle is covered, for instance 120 degrees, or even the full 360 degrees. In principle, also two-dimensional or even three-dimensional structures can be constructed of the above-mentioned uniplanar antenna structures. A two-dimensional structure is formed by, for example, positioning ULA structures side by side, whereby a matrix is formed of the antenna elements.

Above, orthogonal beams have been described which are provided in accordance with the prior art by means of a Butler matrix. However, the beams do not have to be orthogonal. The beams can be directed freely, for instance in such a way that the sector can be narrowed. Narrower sectors provide better isolation between the sectors, for example, and thus it is also possible to generate narrower beams at the edges of the sector. The side beam level can also be reduced. Fixed directioning of an antenna beam refers to the beam being fixedly directed in the horizontal direction, but it can also be directed in the elevation direction, for example in order to change the size of the cell dynamically.

In our example shown in FIG. 3, four fixedly directed narrow antenna beams 302, 304, 306, 308 are formed. In addition, one wide antenna beam 310 is formed, the coverage of which includes all fixedly directed narrow antenna beams 302, 304, 306, 308. The wide antenna beam 310 can be formed using one or more antenna elements 402, 404, 406, 408 of the antenna array 300. In our example, the wide antenna beam 310 is formed using the second antenna element 404. The phase front of the wide antenna beam is illustrated by the broken line 412.

With regard to the estimation of the channel performed in the user equipment, it can be observed that a common pilot signal is transmitted by means of the wide antenna beam 310, and a beam-specific pilot signal is transmitted by means of each fixedly directed narrow antenna beam 302, 304, 306, 308.

A pilot signal refers to a signal which is transmitted by the base transceiver station to the user equipment and with which the impulse response of the channel is formed in the user equipment. The pilot signal contains predetermined symbols, in other words the user equipment knows which symbols the pilot signal that it has received contains. Other names can also be used for the pilot signal, for example a training sequence.

In an embodiment of the invention, the common pilot signal is known as a primary common pilot channel (P-CPICH), the beam-specific pilot signal being known as a secondary common pilot channel (S-CPICH).

With reference to FIG. 3, it can be seen that the user equipment 172 is in the coverage area of the third fixedly directed narrow antenna beam 306, and naturally also in the coverage area of the wide antenna beam 310. When moving in the coverage area of the wide antenna beam 310, the user equipment 172 can at times be between two fixedly directed narrow antenna beams, and if required, handover can be performed between two fixedly directed narrow antenna beams. The common pilot channel can determine the logical cell, whereby, when moving from a wide antenna beam to another, inter-cell handover must be performed. From one point of view, it can be said that the wide antenna beam 310 and the narrow antenna beams within them are generally implemented with the same base transceiver station.

Figure 2:
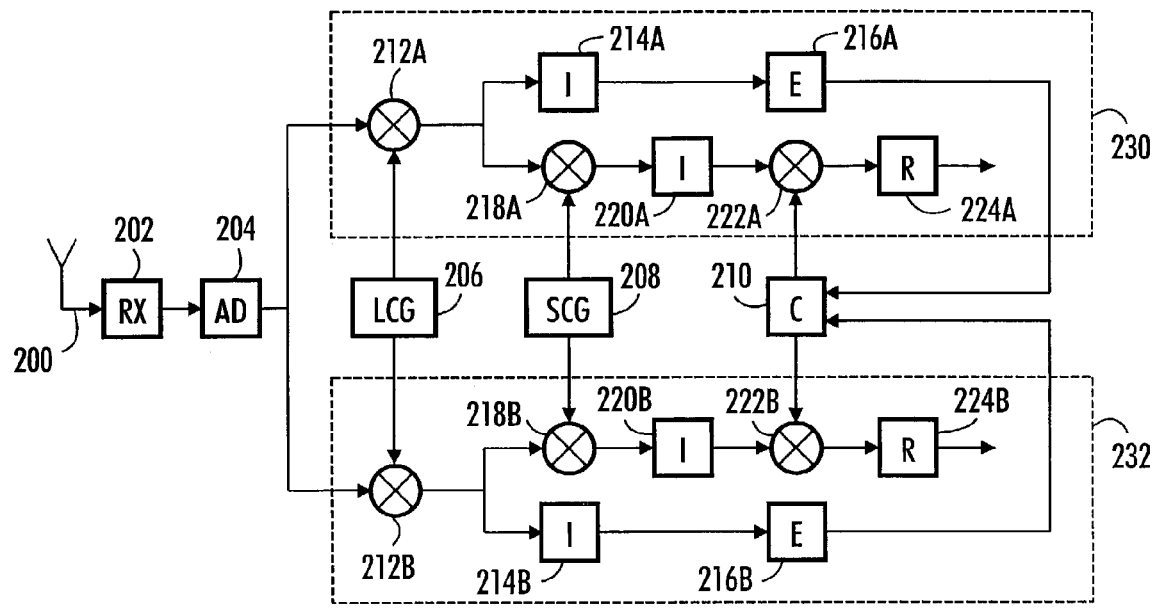
FIG. 2 is a simplified block diagram illustrating interesting parts from the point of view of channel impulse response estimation of a Rake receiver of user equipment.

FIG. 2 now shows a simplified block diagram of interesting parts from the point of view of the estimation of the channel impulse response in the Rake receiver of the user equipment 172. In the CDMA system, Rake receivers are used to distinguish multipath-propagated signal components in the reception. Usually, signal components must in such a case differ from each other at least by one chip of the spreading code used. The Rake receiver comprises Rake fingers, despreading taking place in each finger. In the Rake receiver, the signals of different Rake fingers are combined coherently before bit detection (diversity combination). In addition, the receiver comprises a delay estimator, which has a matched filter per each antenna branch, and an allocation block for Rake fingers. In the matched filter, the received signal is correlated with different delays with a spreading code used to spread a signal, whereby the timing of the spreading code is changed for example in steps of one chip. When the correlation is great, a multipath-propagated signal has been found, which can then be received with a Rake finger by using the delay found. FIG. 2 does not, for the sake of clarity, show the use of antenna diversity or apparatus parts needed for the allocation of Rake fingers. In other words, it is assumed that the delay of the signal path has already been found, whereby it has been possible to allocate a Rake finger to receive a signal.

The downlink channel in the form of an analogue radio signal is received with an antenna 200. The analogue radio signal in question is down-converted into a complex baseband frequency signal in radio frequency parts 202. The complex baseband frequency is then converted into a series of digital samples in an analogue converter 204.

FIG. 2 shows, for the sake of clarity, only two Rake fingers 230, 232. The first Rake finger 230 is defined in our example to receive the common pilot signal and the second Rake finger 232 to receive the beam-specific pilot signal.

Typically, the Rake receiver comprises two code generators, a long-code generator 206 and a short-code generator 208. The long code is also known as a scrambling code and the short code as the spreading code. In the CDMA system, the radio resource is divided between different users by way of code division. The payload of each user is spread over a wide frequency band, for example over a frequency band of five megahertz, by multiplying the payload by the spreading code. The receiver is capable of distinguishing the desired signal by correlating the received signal by the spreading code used for the spreading. The value of the chip can be denoted with zero or one, or by the real number one or minus one. The chip speed is typically significantly higher than the payload (symbol) speed, for example more than a hundred times higher. In addition to the spreading codes, scrambling codes can be used with which a signal is not necessarily spread, but the chips of the spread signal are mixed by multiplying each chip of the signal by the corresponding chip of the scrambling code. The scrambling codes can be extremely long, for instance of the length of a $2^{41}-1$ chip. Code generation is performed with a code generator, for example with a code generator using a linear feedback shift register.

In our example, a suitable long code is taken from the long-code generator to the Rake fingers 230, 232, more precisely to first multipliers 212A, 212B in them. The received digital samples are multiplied by a long-code complex conjugate in the first multiplier 212A, 212B. The signal received in this way is taken to a first integrator 214A, 214B and to a second integrator 218A, 218B. In the second multiplier 218A, 218B, the spreading of the signal is despread by multiplying the digital samples multiplied by the long-code complex conjugate by a short code received from the short-code generator 208.

The received signal processed with a long code is integrated in the first integrator 214A, 214B, and the received signal processed with both a short and a long code is integrated in the second integrator 220A, 220B.

From the first integrator 214A, 214B, the signal is taken to the channel estimator 216A, 216B. The channel estimator 216A, 216B estimates complex channel coefficients by utilizing information contained in the pilot signal. Thus, the channel estimator 216A, 216B forms an impulse response for the received pilot signal. It is to be noted that, depending on the scrambling/spreading coding of the beam-specific pilot signal, its channel estimation can deviate from the structure of FIG. 2. For example the 3GPP standard enables the secondary pilot channel (S-CPICH) to be formed using the same scrambling code as when forming the primary common pilot channel (P-CPICH) but a different spreading code. The standard in question also allows the secondary common pilot channel to have a scrambling code different from that of the primary common pilot channel.

The impulse response of the common pilot signal having been transmitted with a wide antenna beam, formed by the channel estimator 216A, is taken to a block 210. In the same way, the impulse response of the pilot signal having been transmitted with a fixedly directed narrow antenna beam, formed by the channel estimator 216B, is taken to the block 210. In the block 210, a downlink channel impulse response is formed by using the impulse response of the common pilot signal and the impulse response of the beam-specific pilot signal, taking into account the phase difference between the wide antenna beam and the fixedly directed antenna beam.

In an embodiment, the phase difference is taken into account in such a way that in the block 210, the phase of the impulse response of the common pilot signal is turned to be cophasal with the phase of the beam-specific pilot signal.

In an embodiment, the impulse response of the downlink channel is the average value of the impulse response of the common pilot signal and the impulse response of the beam-specific pilot signal turned to be cophasal. The average value may be weighted. The weighting can depend on the power of the common pilot signal and the power of the beam-specific pilot signal.

In an embodiment, the phase difference is formed in the network part of a radio system, for example when directional antenna beams are formed or by measuring signals transmitted by user equipment, and said phase difference is signalled from the network part to user equipment of a radio system receiving downlink channel. Finding the azimuth direction (positioning) of the user equipment can be performed for the user equipment by using known methods, and the network part can form the phase difference on the basis of the positioning information formed, for example in such a way that the network part comprises a database in which the phase difference between the directional narrow antenna beam used in a certain area and the wide antenna beam is recorded.

In an embodiment, the user equipment forms the phase difference itself by analysing received common pilot signals transmitted with the wide antenna beam and beam-specific pilot signals transmitted with the fixedly directed narrow antenna beam. This can be implemented in such a way that the user equipment measures the complex channel impulse responses corresponding to both the wide antenna beam and the directional narrow antenna beam and calculates the phase difference between these two impulse responses. Calculation of the phase differences takes place for each Rake finger separately. The user equipment uses a sufficiently long averaging to receive the phase difference sufficiently reliably. The averaging removes the effect of fast fading. The user equipment can also transmit phase difference information it has collected to the base transceiver station, which, in turn, can in a long run collect statistical data on the phase difference between the wide antenna beam and the directional narrow antenna beam. In this way, it is possible to adapt to the real environment of each base transceiver station. Positioning information of the user equipment can also be utilized in recording the phase difference information in question. In this way, the base transceiver station can transmit the phase difference information to each new piece of user equipment which enters the area of the cell in question and which has not yet measuring information of its own on the phase difference.

The phase difference between the complex channel impulse responses corresponding to the wide antenna beam and the directional narrow antenna beam can also be performed as a calibration measurement in connection with the commissioning of the network. This calibration measurement can be repeated when required.

In an embodiment in block 210, an impulse response h is formed for the downlink channel with Formula:

$$h = h_2 + c \cdot h_1 \cdot \exp(j\Phi), \quad (2)$$

where $h_1$ is the impulse response of a common pilot signal;
$h_2$ is the impulse response of a beam-specific pilot signal;
c is a weighting coefficient; and
$\exp(j\Phi)$ expresses the turning of the phase, where $\Phi$ is the phase difference.

In the example of FIG. 3, Formula 2 gives $$h = h_2 + h_1 \cdot \exp(-j\pi/4), \quad (3)$$

if c=1, because $\Phi = -45°$. The weighting coefficient c can be adjusted according to how much power is allocated to the pilot signal of the wide antenna beam and how much power is allocated to the pilot signal of the directional narrow antenna beam. The weighting coefficient can also be adjusted adaptively, for example depending on the load of the cell or on the radio environment.

From the second integrator 220A, 220B, the signal is taken to a third multiplier 222A, 222B, where the despread pilot signal is multiplied by the complex conjugate of the channel impulse response formed in the block 210 in order to remove the phase difference caused by the channel.

The third multiplier 222A, 222B gives as a result data contained in the received signal, the data containing hard bit decisions and possibly soft reliability information. After that, in a block 224A, 224B, the data is converted into a real signal.

In the receiver, also channel decoding and deinterleaving as well as source decoding can be performed, but because they are performed in a known manner and are not the object of interest here, they are not described in more detail herein.

In order to make the structure of FIG. 2 clearer, effects of multipath propagation of a signal on the receiver structure are not shown. To take this into account, the user equipment is configured to form an impulse response for the downlink channel in the described way for each multipath-propagated signal separately. In practice, this means that multipath-propagated components of the common pilot signal are received by a number of Rake fingers 230, which number possibly varies dynamically. Correspondingly, multi-path components of the beam-specific pilot signal are received by a number of Rake fingers 232, which number possibly varies dynamically. It is to be noted that the number of Rake fingers 230 receiving the common pilot signal does not have to be the same as the number of Rake fingers 232 receiving the beam-specific pilot signal.

The blocks 200 and 202 of FIG. 1 are usually implemented by hardware. Other blocks of FIG. 1 are usually implemented by a processor with software, but also different hardware implementations are possible, for example a circuit constructed of separate logic components or one or more application-specific integrated circuits (ASIC). Also some kind of combination of these implementations is possible. When selecting the manner of implementation, a person skilled in the art takes into account for instance the requirements set for the size and current consumption of the device, the required processing power, manufacturing costs and scale of production.

Figure 5:
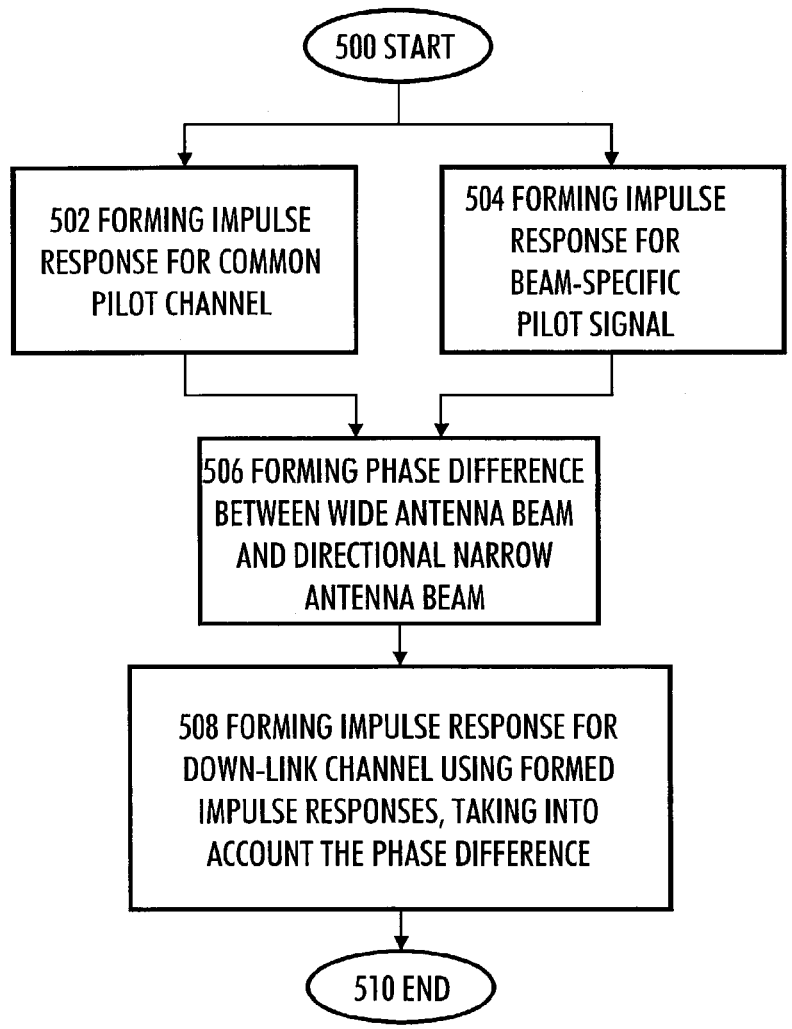
FIG. 5 is a flow diagram illustrating a method of estimating a downlink channel in a radio system.

Next, with reference to the flow chart of FIG. 5, a method of estimating a downlink channel in a radio system is described. Performance of the method is started at 500. After that, an impulse response is formed for a common pilot signal transmitted with a wide antenna beam at 502, and at 504, an impulse response is formed for the pilot signal transmitted with a directional narrow antenna beam. In the manner shown in FIG. 5, 502 and 504 can be performed simultaneously to accelerate the calculation. After that, the phase difference between the wide antenna beam and the directional narrow antenna beam is formed at 506. Finally, at 508, an impulse response is formed for the downlink channel by using the impulse response of the common pilot signal and the impulse response of the beam-specific pilot signal, taking into account the phase difference formed. The performance of the method is terminated at 510.

User equipment of the type described above is suitable for performing the method, but also other kinds of devices can be applicable to performing the method. Preferred embodiments of the invention are disclosed in the attached dependent method claims. Their operation has been described above in connection with the user equipment, and therefore the description is not repeated in its entirety here.

In an embodiment, the method further comprises the following measure: turning the phase of the impulse response of the common pilot signal to be cophasal with the phase of the beam-specific pilot signal to take the phase difference into account.

In an embodiment, the impulse response of the downlink channel is an average value of the impulse response of the common pilot signal and the impulse response of the beam-specific pilot signal turned to be cophasal with each other. The average value may be weighted. The weighting can depend on the power of the common pilot signal or the power of the beam-specific pilot signal.

In an embodiment, the phase difference is formed in the network part of the radio system, and the phase difference in question is signalled to the user equipment of a radio system receiving the downlink channel. In an embodiment, positioning is performed for the user equipment, and the network part forms the phase difference on the basis of the positioning information formed.

In addition to or instead of the preceding embodiment, the phase difference can be formed in user equipment of a radio system receiving the downlink channel.

In an embodiment, an impulse response of the downlink channel is formed in the above-described manner for each multipath-propagated component separately.

In an embodiment of the method, an impulse response h is formed for the downlink channel with Formula 2.

Figure 6:
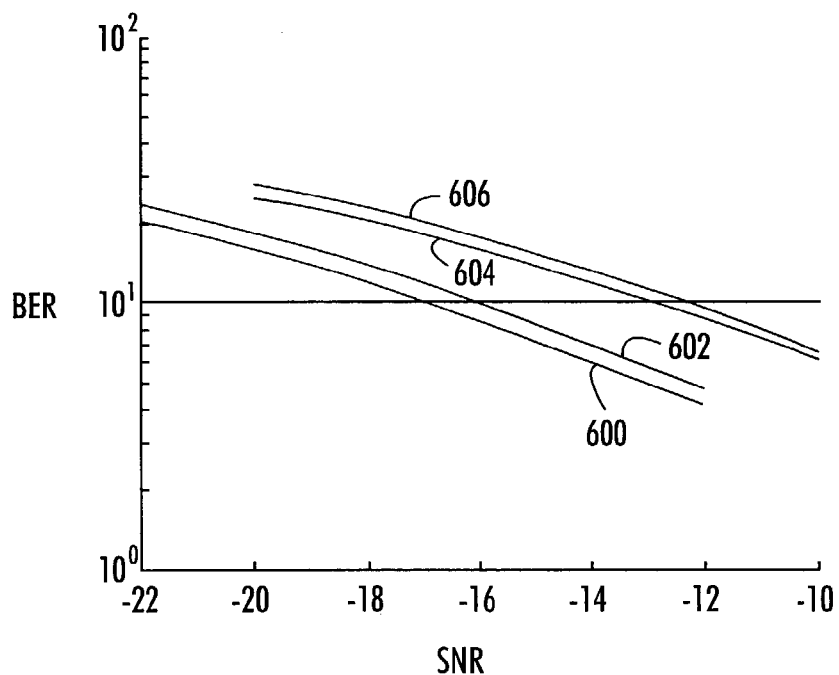
FIGS. 6 and 7 illustrate the efficiency of the invention compared with the prior art.
Figure 7:
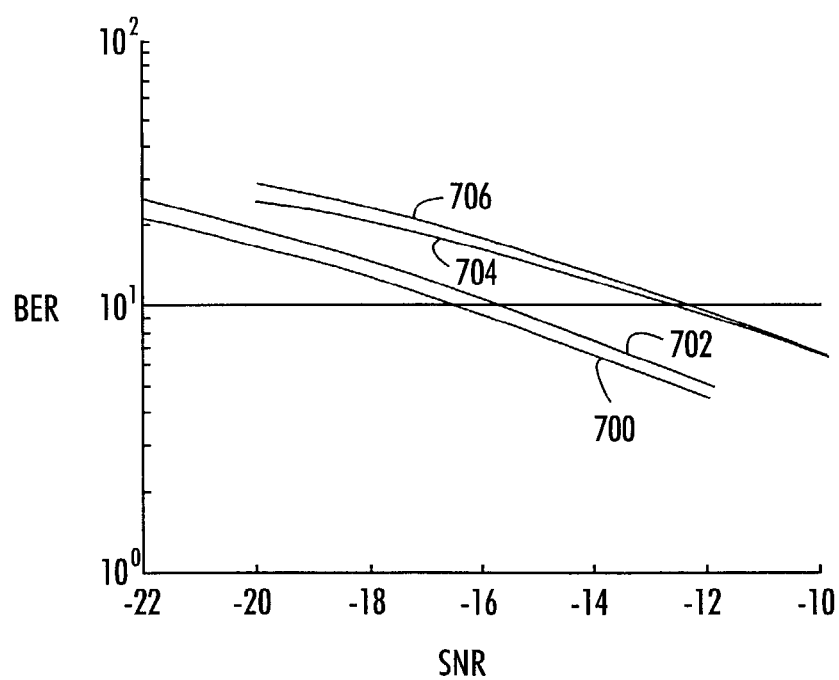

The results of the experiments carried out by the applicant are described in FIGS. 6 and 7. The horizontal axis shows the signal-noise ratio of the downlink channel in decibels, and the vertical axis shows the bit-error ratio (BER) without the corrective effect of the channel coding. The simulation parameters used were:

- 5 pilot bits and 20 data bits per slot;
- spreading factor 100;
- interference modelled as AWGN (Average White Gaussian Noise);
- 2D Codit channel model applied with 20 Rayleigh-fading scatterers around the UE;
- 1-tap delay profile (flat fading);
- 5000 slots run for different random seeds (5 different scattering environments);
- user equipment speed 50 km/h;
- P-CPICH transmitted from antenna element 2 with gain 1;
- S-CPICH gain 0.25; after beamforming with 4 antennas gain 4×0.25=1.

Thus, the reception levels of the P-CPICH and S-CPICH signals in the equipment were the same. It is to be noted, however, that S-CPICH contained only five bits per slot and thus the S-CPICH energy was only ⅕ of the P-CPICH energy.

In FIG. 6 the angular spread of the user equipment signals in the base transceiver station is five degrees and in FIG. 7 ten degrees, which are typical figures in a macro cell.

The solution according to the prior art is to use only P-CPICH for estimating the downlink channel, whereas in the present invention the downlink channel is estimated as described using both P-CPICH and S-CPICH. FIGS. 6 and 7 further describe two different options for the location of the user equipment: in the direction of the fixedly directed antenna beam or between two fixedly directed antenna beams.

In FIG. 6, the curve 600 indicates the results received when the user equipment is in the direction of the fixedly directed antenna beam, and curve 602 indicates the results received when the user equipment is in the direction of the fixedly directed antenna beam. The gain achieved with the invention is 0.9 dB at the uncoded BER level of 10%. The pair of curves 604/606 indicates results corresponding to those of the pair of curves 600/602 when the user equipment is between two fixedly directed antenna beams. Thus, the gain achieved with the invention is 0.5 dB at the uncoded BER level of 10%.

In a corresponding manner, FIG. 7 shows two pairs of curves 700/702 and 704/706. The gain achieved with the invention is now somewhat lower: 0.8 dB when the user equipment is in the direction of a fixedly directed antenna beam, and 0.3 dB when the user equipment is between two fixedly directed antenna beams.

The raw bit error ratio of 10% was selected for the experiments, because it reflects well the operation point of the WCDMA. As can be seen from the results, gain is achieved irrespective of the direction of the user equipment. Thus, the invention increases the downlink capacity in radio systems using fixedly directed narrow antenna beams. Using the invention allows the power of S-CPICH to be maintained low.

Although the invention has been described above with reference to the example according to the attached drawings, it will be obvious that it is not confined to this example but can be modified in a plurality of ways within the inventive idea defined by the attached claims. The example primarily describes the use of fixedly directed antenna beams, but the invention can also be applied when dynamically directional narrow antenna beams are used. In such a case, there is at least one directional narrow antenna beam reserved for each user, the beam being dynamically directed towards the user when the user is moving. Thus, a separate pilot signal can be reserved per each narrow antenna beam of the user. The phase difference between the wide antenna beam and the dynamically directed narrow antenna beam can be formed for example at given intervals, but otherwise the method according to the invention does not differ much from what has been described above.

The invention claimed is:

1. A method of estimating a downlink channel in a radio system, comprising:
forming an impulse response for a common pilot signal transmitted with a wide antenna beam;
forming an impulse response for a beam-specific pilot signal transmitted with a directional narrow antenna beam;
forming a phase difference between the wide antenna beam and the directional narrow antenna beam;
forming an impulse response for the downlink channel by using the impulse response of the common pilot signal and the impulse response of the beam-specific pilot signal, taking into account the phase difference formed; and
turning the phase of the impulse response of the common pilot signal to be cophasal with the phase of the beam-specific pilot signal to take the phase difference into account.

2. A method according to claim 1, wherein the impulse response of the downlink channel is the average value of the impulse response of the common pilot signal and the impulse response of the beam-specific pilot signal that have been turned to be cophasal.

3. A method according to claim 2, wherein the average value is weighted.

4. A method according to claim 3, wherein the weighting depends on the power of the pilot signal and the power of the beam-specific signal.

5. A method according to claim 1, wherein the phase difference is formed in a network part of the radio system, and the phase difference is signalled to user equipment of a radio system receiving the downlink channel.

6. A method according to claim 5, wherein positioning of the user equipment is performed for the user equipment, and the network part forms the phase difference on the basis of the positioning information.

7. A method according to claim 1, wherein the phase difference is formed in user equipment of a radio system receiving the downlink channel.

8. A method according to claim 1, wherein an impulse response of the downlink channel is formed for each multipath-propagated component separately by using the impulse response of the common pilot signal and the impulse response of the beam-specific pilot signal, taking into account the phase difference formed.

9. A method according to claim 1, wherein the directional narrow antenna beam is fixedly directed narrow antenna beam.

10. A method of estimating a downlink channel in a radio system, comprising:
forming an impulse response for a common pilot signal transmitted with a wide antenna beam;
forming an impulse response for a beam-specific pilot signal transmitted with a directional narrow antenna beam;
forming a phase difference between the wide antenna beam and the directional narrow antenna beam; and
forming an impulse response for the downlink channel by using the impulse response of the common pilot signal and the impulse response of the beam-specific pilot signal, taking into account the phase difference formed wherein an impulse response h is formed for the downlink channel with Formula $h = h_2 + c \cdot h_1 \cdot \exp(j\Phi)$, where
$h_1$ is the impulse response of a common pilot signal;
$h_2$ is the impulse response of a beam-specific pilot signal;
c is a weighting coefficient; and
$\exp(j\Phi)$ expresses the turning of the phase, where $\Phi$ is the phase difference.

11. User equipment of a radio system, comprising:
means for forming an impulse response for a common pilot signal transmitted with a wide antenna beam;
means for forming an impulse response for a beam-specific pilot signal transmitted with a directional narrow antenna beam;
impulse response means for forming an impulse response for a downlink channel by using the impulse response of the common pilot signal and the impulse response of the beam-specific pilot signal, taking into account a phase difference formed between the wide antenna beam and the directional narrow antenna beam; and
means for turning the phase of the impulse response of the common pilot signal to be cophasal with the phase of the beam-specific pilot signal to take the phase difference into account.

12. User equipment according to claim 11, wherein the impulse response of the downlink channel is the average value of the impulse response of the common pilot signal and the beam-specific pilot signal that have been turned to be cophasal.

13. User equipment according to claim 12, wherein the average value is weighted.

14. User equipment according to claim 13, wherein the weighting depends on the power of the common pilot signal and the power of the beam-specific pilot signal.

15. User equipment according to claim 11, wherein the phase difference is formed in a network part of the radio system, said phase difference is signalled from the network part to user equipment of a radio system receiving the downlink channel, and the user equipment further comprises means for receiving the phase difference formed.

16. User equipment according to claim 15, wherein positioning of the user equipment is performed for the user equipment, and on the basis of the positioning information formed, the network part forms the phase difference.

17. User equipment according to claim 11, wherein the user equipment further comprises means for forming the phase difference.

18. User equipment of a radio system, comprising:
means for forming an impulse response for a common pilot signal transmitted with a wide antenna beam;
means for forming an impulse response for a beam-specific pilot signal transmitted with a directional narrow antenna beam; and
impulse response means for forming an impulse response for a downlink channel by using the impulse response of the common pilot signal and the impulse response of the beam-specific pilot signal, taking into account a phase difference formed between the wide antenna beam and the directional narrow antenna beam wherein the impulse response means form an impulse response h for the downlink channel with Formula $h = h_2 + c \cdot h_1 \cdot \exp(j\Phi)$, where
$h_1$ is the impulse response of a common pilot signal;
$h_2$ is the impulse response of a beam-specific pilot signal;
c is a weighting coefficient; and
$\exp(j\Phi)$ expresses the turning of the phase, where $\Phi$ is the phase difference.

19. User equipment of a radio system, being configured to:
form an impulse response for a common pilot signal transmitted with a wide antenna beam;
form an impulse response for a beam-specific pilot signal transmitted with a directional narrow antenna beam;
form an impulse response for a downlink channel by using the impulse response of the common pilot signal and the impulse response of the beam-specific pilot signal, taking into account a phase difference formed between the wide antenna beam and the directional narrow antenna beam; and
turn the phase of the impulse response of the common pilot signal to be cophasal with the phase of the beam-specific pilot signal to take the phase difference into account.

20. User equipment according to claim 19, wherein the impulse response of the downlink channel is the average value of the impulse response of the common pilot channel and the beam-specific pilot signal that have been turned to be cophasal.

21. User equipment according to claim 20, wherein the average value is weighted.

22. User equipment according to claim 21, wherein the weighting depends on the power of the common pilot signal and the power of the beam-specific pilot signal.

23. User equipment according to claim 19, wherein the phase difference is formed in a network part of the radio system, said phase difference is signalled from the network part to user equipment of a radio system receiving the downlink channel, and the user equipment is further configured to receive the phase difference formed.

24. User equipment according to claim 23, wherein positioning of user equipment is performed for the user equipment, and on the basis of the positioning information formed, the network part forms the phase difference.

25. User equipment according to claim 19, wherein the user equipment is further configured to form the phase difference.

26. User equipment of a radio system, being configured to:
form an impulse response for a common pilot signal transmitted with a wide antenna beam;
form an impulse response for a beam-specific pilot signal transmitted with a directional narrow antenna beam; and form an impulse response for a downlink channel by using the impulse response of the common pilot signal and the impulse response of the beam-specific pilot signal, taking into account a phase difference formed between the wide antenna beam and the directional narrow antenna beam wherein the user equipment is configured to form an impulse response h for the downlink channel with Formula $h = h_2 + c \cdot h_1 \cdot \exp(j\Phi)$, where $h_1$ is the impulse response of a common pilot signal;

$h_2$ is the impulse response of a beam-specific pilot signal;

c is a weighting coefficient; and $\exp(j\Phi)$ expresses the turning of the phase, where $\Phi$ is the phase difference.

* * * * *